United States Patent

[11] 3,572,548

[72] Inventors Bernard P. Fuchs
R.R. #3, 61068;
Byron P. Sanderson, P.O. Box 233,
Rochelle, Ill. 61068
[21] Appl. No. 833,282
[22] Filed June 16, 1969
[45] Patented Mar. 30, 1971

[54] PLATELESS SEED PLANTER
9 Claims, 6 Drawing Figs.
[52] U.S. Cl. .................................................. 221/225, 221/254
[51] Int. Cl. ...................................................... B65h 5/00
[50] Field of Search .......................................... 221/220, 225, 254, 266, 277, 262

[56] References Cited
UNITED STATES PATENTS
773,205 10/1904 Green ........................... 221/254X
1,241,387 9/1917 Hutton ......................... 221/254X Primary Examiner—Stanley H. Tollberg
Attorney—Rummler and Snow ABSTRACT: A hollow generally cylindrical planter housing mounted on a horizontal axis and closed by end plates, one of which has an opening to the interior of the housing adjacent the bottom thereof for the entry of a seed supply, the housing having an outlet opening in its cylindrical wall for discharge of seeds, a spring finger orbiting the housing axis close to the surrounding wall, and means for opening the space between the spring finger and the circumferential wall at the bottom portion of the housing whereby a seed will enter between the spring finger and the housing wall and the spring finger will carry the seed along the said wall to the outlet opening.

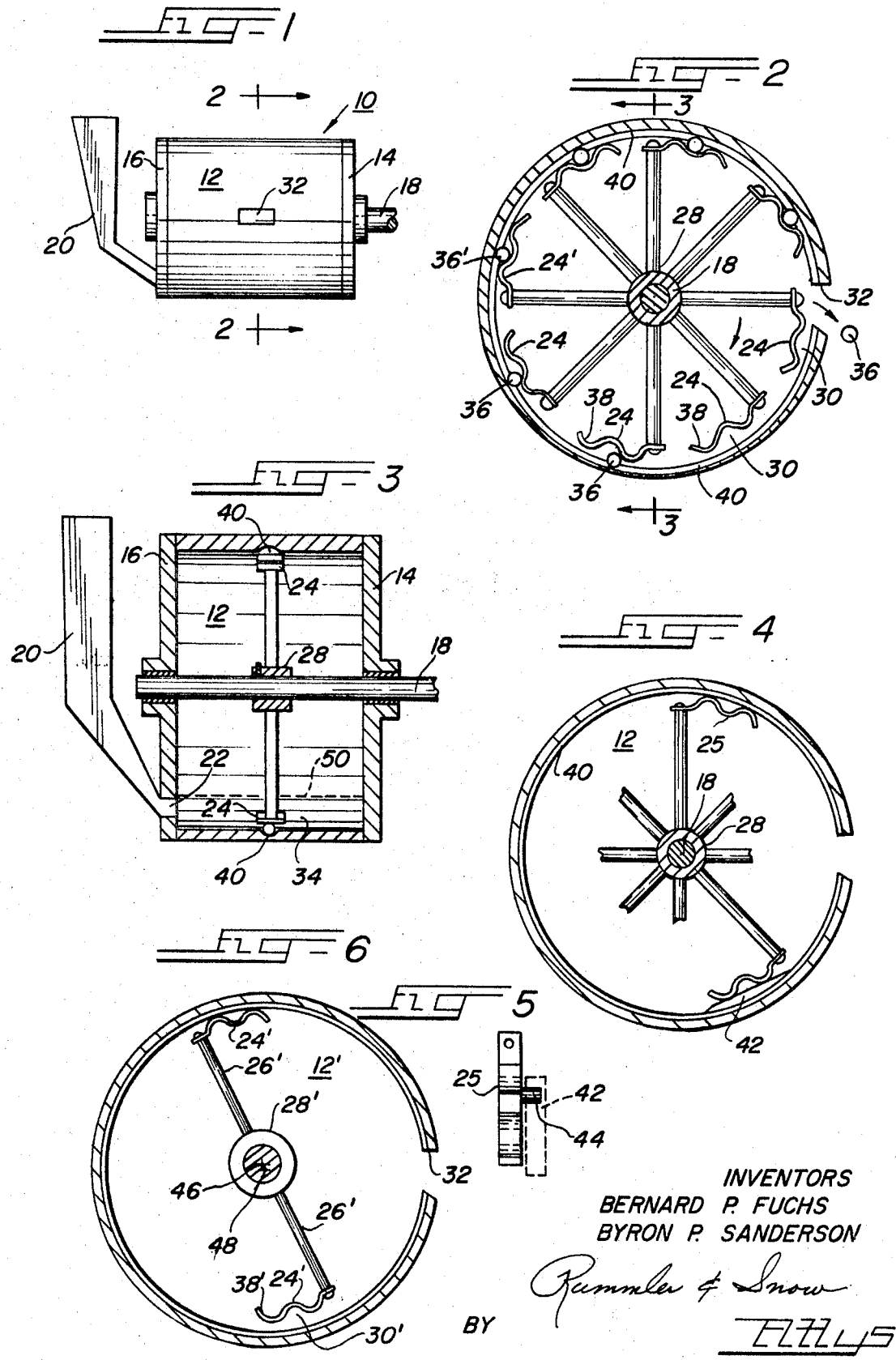
INVENTORS
BERNARD P. FUCHS
BYRON P. SANDERSON 3,572,548

PLATELESS SEED PLANTER

BACKGROUND OF THE INVENTION

The present invention relates to automatic seed planters of the type intended to be mounted on or attached to a vehicle adapted to travel over the ground for depositing seeds at spaced intervals along a furrow formed in the ground. Such apparatus, in addition to the seed selector and depositor, includes means for forming the furrow and then following the seed depositor, means are provided for closing the furrow. Heretofore the seed selector and depositor mechanism has been somewhat complicated in structure and very often, quite inaccurate in its operation, particularly in skipping and leaving areas not planted or in depositing a plurality of seeds where only one is desired. Also, in many cases, the planter mechanisms have been much too complicated in their structure and subject to damage during normal operation. Furthermore, automatic seed planters have theretofore, in general, been quite slow in their operation thus necessitating slow speeds of ground travel. The present invention is intended to overcome most, if not all, of these deficiencies of prior automatic seed planter devices.

SUMMARY OF THE INVENTION

The invention concerns a seed planter having a minimum of moving parts and adapted to discharge seeds one at a time at substantially any rate. Essentially, the structure involved is a generally cylindrical hollow housing closed at its ends and disposed with its axis horizontal, the housing being provided with means for maintaining a continuous supply of seeds to a predetermined level above the housing bottom and having a seed discharge outlet in its sidewall above the level of the seed supply. Seeds are engaged and transported singly from the supply at the bottom of the housing to the discharge outlet by means of a shaped finger orbiting the housing axis in a plane normal thereto and intersecting the discharge outlet, the said finger traveling close to the inner wall surface of the housing and being adapted to engage a seed at the bottom of the housing and then hold the seed against the housing wall while transporting the seed along the orbital path from the seed supply to the discharge outlet.

The seed-selecting finger is carried by an arm extending radially from a rotatable shaft extending horizontally through the housing, the finger extending forwardly from the arm in the direction of orbit and being shaped to provide a pocket intermediate its ends, between the finger and the housing wall, in which a seed may become lodged as the finger passes through the mass of seeds in the housing, whereby the seed will be carried by the finger to the discharge outlet where the seed will be delivered to suitable chute means for directing it to the planting point.

The inventive concept here involved is to provide an internal housing configuration whereby the mass of seeds at the bottom of the housing will gravitate into the path of the gyrating finger and to provide means for opening the space between the finger and the housing wall in the area of seed concentration sufficiently for the entry of a seed into the pocket between the finger and the housing wall as the finger passes through the seed mass. A preferred way to provide for entry of a seed into the finger pocket is to grind out the bottom area of the housing wall, at least in the area of finger orbit, so as to open the space below the finger wherein a seed can be lodged. Other arrangements are also disclosed.

A plurality of seed selecting fingers may be disposed to follow a single orbit, the several finger-carrying arms being equally spaced in the angular direction, and a single housing may enclose several axially spaced finger groups whereby a plurality of seeds may be delivered from the planter at the same time. Preferably the rotary shaft which gyrates the seed-selecting fingers is driven, through suitable gearing, in timed relation with the wheels of the vehicle on which the planter is mounted and in that manner, the rate of seed delivery is regulated in accordance with ground travel speed for any particular distance between seed deposits.

Particular advantages of the improved planter construction reside in the fact that the seed-picking finger will always pick up and deliver a seed as long as there is a supply of seeds in the housing; in the fact that the finger will deliver only one seed at a time to the discharge outlet; and in the fact that an arrangement of multiple fingers traveling a single orbit permits a more rapid operation of the planting machine or a slower operation of seed selection and delivery or both. Thus a greater ground speed of the planting machine can be had without danger of skipping due to rapid operation of the seed selectors. Further advantages are found in the simplicity of the construction of the improved seed planter and the fact that the planter can work with ungraded seeds.

DESCRIPTION OF THE DRAWINGS

An illustrative embodiment of this invention is shown in the accompanying drawings wherein:

FIG. 1 is a front view of a seed planter unit according to the invention;

FIG. 2 is a somewhat enlarged sectional view of the same as taken on line 2–2 of FIG. 1;

FIG. 3 is a sectional view of the same as taken on line 3–3 of FIG. 2;

FIG. 4 is a sectional view showing a modified arrangement for operating the seed selecting finger to engage and carry a seed;

FIG. 5 is a plan view of a seed selecting finger as used in the modification of FIG. 4, the fixed cam being indicated by dash outline; and FIG. 6 is a sectional view like FIGS. 2 and 4 but showing a still further modification of the seed-selecting finger operating means.

DESCRIPTION OF THE PREFERRED EMBODIMENTS

The drawings illustrate, in a more or less schematic fashion, the primary concept of our invention which concerns only the seed-selecting and delivery mechanism and it will be understood that such a mechanism can be embodied readily in seed planter apparatus intended to be attached to the usual tractor or other pulling vehicle for use in a conventional seed planting operation. Seed planting machines, generally, are well known in this art. Thus the uses of the invention and the manner of its adaptation to seed planting apparatus will be readily understood by those skilled in the art. For that reason, only the essentials of our concept have been illustrated.

As indicated by the drawings, the seed selector housing 10 is a hollow, generally cylindrical body 12 closed at its ends by plates 14 and 16 each of which is formed with a boss for journaling a drive shaft 18 which extends axially through the housing body 12. Seeds are supplied to the housing 12 continuously by means of a suitable conduit 20 leading from the usual seed hopper, not shown, and the seed inlet 22, shown entering through the end plate 16, is located at a predetermined distance above the bottom of the housing so that the quantity of seed in the housing will be self-limiting to a maximum depth of about one-tenth of the internal diameter of the housing.

In the form shown, the seed-selecting device comprises a plurality of selector fingers 24 each of which is formed from a strip of flat, relatively thin, spring metal stock and each finger is mounted at the end of a spokelike arm 26 projecting radially from a hub 28 suitably secured on the shaft 18. As indicated in FIG. 2, the number of arms and selector fingers that may be carried by the hub 28 is limited only by the length of the fingers, the inner circumference of the housing 12, and the space between fingers required for seed fall in front of each succeeding finger.

The selector fingers 24 are preferably all of the same size and shape and as shown, each finger extends forwardly, in the direction of travel, from the respective arm 26 and each finger is formed to the shape of a flattened "w" so as to curve first from the end of the arm 26 toward the inner surface of the housing wall and then to loop outwardly from the housing wall and back again to form a pocket 30 intermediate the ends of the finger. Also, as shown, the leading end of the finger 24 is curved outwardly away from the housing wall and the overall form of the finger is such that as it passes through a mass of seeds, a seed can readily pass under the leading end of the finger and into the pocket 30 to be thereafter carried by the finger along the circumference of the housing for ultimate discharge through an outlet opening 32 suitably located in the sidewall of the housing and in the plane of the selector finger orbit.

In the form of our invention shown in FIGS. 2 and 3, the curvature of the inner wall surface of the housing is enlarged at the bottom portion 34 of the housing so that in that area, the spring fingers 24 will be spaced about one-half the seed thickness away from the housing wall while they pass through the mass of seeds contained in the housing. Thus, while the radius of curvature of the housing inner wall is constant throughout the upper half of the housing, the radius of curvature gradually increases as it approaches the bottom center 34 of the housing, where it reaches a maximum, and then gradually decreases as it approaches the horizontal plane of the housing axis. Thus, as the spring finger 24 travels over the inner surface of the housing, it barely clears the surface of the housing throughout the upper half thereof and then, after passing the outlet 32, the finger becomes gradually spaced from the inner wall of the housing until the distance between the forward end of the pocket 30 becomes large enough to admit a seed 36 beneath the outwardly curved leading end 38 of the finger and into the pocket 30 by a resilient yielding of the finger under the pressure exerted by the frictional drag of the seed against the housing wall as it is pushed by the outwardly curved leading end of the finger.

Because of the resilient nature of the spring finger 24, it is capable of receiving seeds of a considerable range of sizes into the finger pocket 30 as the finger passes through the seed mass in the housing. Thus the seeds to be handled by our improved selector mechanism need not be graded and the mechanism will accurately feed, one by one, seeds of the full range of sizes normally occurring in the particular variety the planter is intended to handle. This is illustrated in FIG. 2 by the large seed 36' being carried by the finger 24'.

Also, as shown in FIG. 3, a circumferential groove 40 is formed in the housing wall along the orbit of the fingers 24, this groove 40 serving the function of centering seeds in the orbit of the fingers 24 and orienting those that are not round to be parallel with the groove so that each finger will be certain of engaging a seed and receiving a seed into the finger pocket 30. The extension of the groove 40 throughout the circumference of the housing 12 serves to keep the seed positioned beneath the spring finger and in the pocket 30 as the finger travels around the upper half of the housing where the finger is substantially in engagement with the surface of the housing.

As indicated in FIG. 2, the seeds 36 are expelled from the housing, one at a time, through the outlet 32 and to assure that each seed carried by a finger will be delivered through the outlet 32, the radius of curvature of the inner wall of the housing does not begin to increase until after the outlet 32 is passed. Thus a seed carried in the pocket 30 of any finger 24 is prevented from passing the lower lip of the outlet 32 and the finger 24 does not begin to rise from the surface of the housing wall until it is well past the seed discharge outlet.

In the modified form of our invention shown in FIG. 4, the inside surface of the housing 12 is perfectly cylindrical, the radius of curvature being the same throughout the entire circumference, and in this case, the seed-selecting finger 25 is mechanically actuated by means of a cam 42 fixedly located beside the finger orbit with the cam reaching its maximum height about 30° in advance of the bottom center of the housing and the dropoff being close to the bottom center of the housing.

For operation by the cam 42, the finger 25 is provided with a laterally extending tab 44, as shown in FIG. 5, and as the tab 44 rides over the cam 42, the leading end of the finger 25 is elevated sufficiently to admit a seed into the pocket formed by the outwardly bulged or bowed portion intermediate the ends of the FIG. Thus, the operational effect of this form of our invention is substantially the same as though the bottom portion of the housing 12 were ground or cut away, as in the case of the form shown in FIGS. 2 and 3.

A still further modification of our invention, wherein the seed-selecting fingers are manipulated to engage and then transport a seed, is shown in FIG. 6 wherein the shaft 18' is eccentrically journaled in the end plates of a fully cylindrical housing 12'. Thus, the spokes or arms 26' projecting radially from the hub 28', being all of the same length, will dispose the respective fingers 24' close to the inner surface of the housing in the upper portion thereof and in spaced relation with the housing at the lower seed-carrying portion thereof. In this case, the amount of eccentricity of the axis 46 of the shaft 18' relative to the axis 48 of the cylindrical inner surface of the housing is such as to afford sufficient elevation of the finger 24', as it traverses the lower portion of the housing, to admit a seed beneath the leading end 38' of the finger and into the pocket 30' intermediate the ends of the finger. Thus, it is the eccentricity of the shaft 18' which serves the same purpose as the increase of the radius of the inner housing surface at the bottom portion of the housing as shown in FIGS. 2 and 3.

In the operation of improved seed selecting and discharge device, the housing will contain seeds supplied from the conduit 20 to about the level of the dotted line 50 shown in FIG. 3. These seeds will gravitate toward the bottom center of the housing and into the groove 40 and when the seeds are of a kind where they are somewhat elongate rather than round, they will tend to orient themselves in the groove 40 so that their greater length will be along the orbit of the seed selecting fingers. Thus, as each finger enters the mass of seeds at the bottom of the housing and becomes elevated or otherwise spaced from the housing wall, a seed will be engaged by the leading end 38 of the finger and thereafter be worked into the pocket 30 intermediate the ends of the finger. This last will occur because of friction between the seed and the wall of the groove 40 in which the seed will be when the finger engages it. Once the seed becomes lodged in the pocket 30, the resilience of the finger will keep it trapped and as the finger travels its orbit, the seed will be transported about 270° around the circumference of the housing until it reaches the discharge outlet 32, at which point the seed will be immediately ejected into a suitable delivery tube, not shown. In the event a second seed becomes lodged beneath the outwardly curved leading end of the finger, after a seed has become lodged in the pocket 30, the two seeds will travel together until the finger reaches the upper portion of the housing, at which point the second seed will fall away and return to the bottom of the housing. Thus, the selector finger 24 will always carry a single seed from the supply of seeds at the bottom of the housing to the discharge outlet 32.

Also, because of the resilient nature of the selector fingers 24, seeds of a range of sizes can be handled in random order and size grading of the seeds supplied to the planter device of our invention is not necessary. The advantages of this capability will be obvious to those skilled in the art as well as the fact that, as long as seeds are supplied to the housing 12, each finger will pick up and discharge a seed during the course of each revolution about the housing axis thereby obviating skipping and assuring the delivery of seeds one at a time.

We claim:

1. A seed planter comprising a generally cylindrical housing having end walls and a rotatable shaft journaled in said end walls and extending axially through said housing, said housing being disposed in an axially horizontal position:

a. an arm extending radially from said shaft within said housing;

b. a seed pickup finger projecting forwardly from said arm in the direction of rotation of said shaft;

1. said pickup finger being disposed to extend along the curved inner sidewall surface of said housing substantially in contact therewith during at least a major portion of its orbit as said shaft is rotated,
c. an outwardly bowed portion on said finger intermediate the ends thereof to provide a pocket between the finger and the housing wall;
d. means for causing said finger to become elevated from the wall of said housing as it traverses the bottom portion thereof; and
e. a seed discharge outlet in the housing sidewall intermediate the top and bottom thereof.

2. A seed planter according to claim 1 wherein the seed pickup finger is formed from a strip of resilient material and has an outwardly turned leading end.

3. A seed planter according to claim 1 wherein the radius of the curvature of the inner surface of the housing is increased at the bottom portion of the housing for causing the said finger to become elevated therefrom.

4. A seed planter according to claim 1 wherein the inner wall surface of the housing is provided with a circumferential groove in the plane of the pickup finger orbit.

5. A seed planter according to claim 1 wherein cam means are provided in advance of the bottom center of the housing for lifting the seed pickup finger away from the housing wall as the finger enters the bottom central portion of the housing.

6. A seed planter according to claim 1 wherein the rotatable shaft is journaled in the housing end walls eccentrically of the housing axis and in an upward direction therefrom for causing the finger to become elevated from the wall of the housing at the bottom portion thereof.

7. A seed planter according to claim 1 wherein one of the end walls has an opening for the introduction of seeds from a supply thereof.

8. A seed planter according to claim 7 wherein the said end wall opening is located with its top edge spaced from the bottom center of the housing a distance no greater than one-tenth the maximum internal diameter of the housing.

9. A seed planter according to claim 8 wherein means connected to said end wall opening are provided for the continuous delivery of seeds into the bottom central portion of said housing.